United States Patent
Gehrke et al.

(10) Patent No.: US 11,571,068 B2
(45) Date of Patent: Feb. 7, 2023

(54) CONTROL DEVICE AND CONTROL SYSTEM FOR AN ELECTROMOTIVE ADJUSTING DRIVE OF AN ITEM OF FURNITURE

(71) Applicant: DewertOkin GmbH, Kirchlengern (DE)

(72) Inventors: Karsten Gehrke, Porta Westfalica (DE); Steffen Loley, Osnabrück (DE); Alexander Tews, Bielefeld (DE)

(73) Assignee: Dewertokin Technology Group Co., Ltd, Jiaxing (CN)

( * ) Notice: Subject to any disclaimer, the term of this patent is extended or adjusted under 35 U.S.C. 154(b) by 421 days.

(21) Appl. No.: 16/614,198

(22) PCT Filed: May 16, 2018

(86) PCT No.: PCT/EP2018/062691
§ 371 (c)(1),
(2) Date: Nov. 15, 2019

(87) PCT Pub. No.: WO2018/210915
PCT Pub. Date: Nov. 22, 2018

(65) Prior Publication Data
US 2021/0106138 A1  Apr. 15, 2021

(30) Foreign Application Priority Data
May 16, 2017 (DE) .................... 20 2017 102 949.2

(51) Int. Cl.
*G05B 15/02* (2006.01)
*A47C 1/024* (2006.01)
(Continued)

(52) U.S. Cl.
CPC .......... *A47C 1/0242* (2013.01); *A47C 31/008* (2013.01); *G05B 15/02* (2013.01); *G08C 17/02* (2013.01)

(58) Field of Classification Search
CPC .... A47C 1/0242; A47C 31/008; G05B 15/02; G08C 17/02; H04W 4/80
See application file for complete search history.

(56) References Cited

U.S. PATENT DOCUMENTS 9,025,583 B2   5/2015  Chiou et al.
2006/0281488 A1*  12/2006  Chang .................. H04B 1/0082
                                                    455/553.1
(Continued)

FOREIGN PATENT DOCUMENTS

DE    102010016405    1/2011
DE    202016103605    5/2017
WO    WO 2007/113883   10/2007

OTHER PUBLICATIONS

Ng et al. "Miniaturized 122 GHz System-on-Chip Radar Sensor with On-Chip Antennas Utilizing a Novel Antenna Design Approach" from "2016 IEEE MTT-S International Microwave Symposium (IMS)" (Year: 2016).*

(Continued)

*Primary Examiner* — Yuhui R Pan
(74) *Attorney, Agent, or Firm* — Henry M. Feiereisen LLC

(57) ABSTRACT

A control system for controlling an adjusting drive for an item of furniture includes a control device connected to the adjusting drive, and a first operating unit. The control device is configured to receive signals from the first operating unit transmitted wirelessly via a transmission unit over a first transmission link, and to control the adjusting drive as a function of the signals received. The control device is also configured to receive further signals from a second operating (Continued)

unit transmitted wirelessly via the transmission unit over a second transmission link and to control the adjusting drive as a function of the further signals received. The second transmission link differs from the first transmission link.

8 Claims, 1 Drawing Sheet

(51) Int. Cl.
*A47C 31/00* (2006.01)
*G08C 17/02* (2006.01)

(56) References Cited

U.S. PATENT DOCUMENTS

| | | | |
|---|---|---|---|
| 2010/0328133 A1* | 12/2010 | Nojima | H04N 21/41407 |
| | | | 341/176 |
| 2014/0277778 A1 | 9/2014 | Nunn et al. | |
| 2015/0182033 A1* | 7/2015 | Brosnan | A47C 27/083 |
| | | | 700/282 |
| 2016/0120740 A1 | 5/2016 | Rawls-Meehan | |
| 2019/0021675 A1* | 1/2019 | Gehrke | A47C 21/003 |

OTHER PUBLICATIONS

International Search Report issued by the European Patent Office in International Application PCT/EP2018/062691 dated Jun. 28, 2018.
German Search Report dated Jan. 22, 2018 with respect to corresponding German patent application No. 20 2017 102 949.2.
Translation of German Search Report dated Jan. 22, 2018 with respect to corresponding German patent application No. 20 2017 102 949.2.
Christin Richter: "Die besten Samsung Remote Apps: So nutzt ihr das Smartphone als Fernbedienung", retrieved from the internet, Jul. 19, 2016.
M.P. Forrer: "1974: Digital Watch is First System-On-Chip Integrated Circuit", retrieved from the Internet, Sep. 30, 2019.
Marvell Semiconductor Inc: Yes! Wi-Fi and Bluetooth Can Cooexist in Handheld Devices—White Paper, 2010.

* cited by examiner

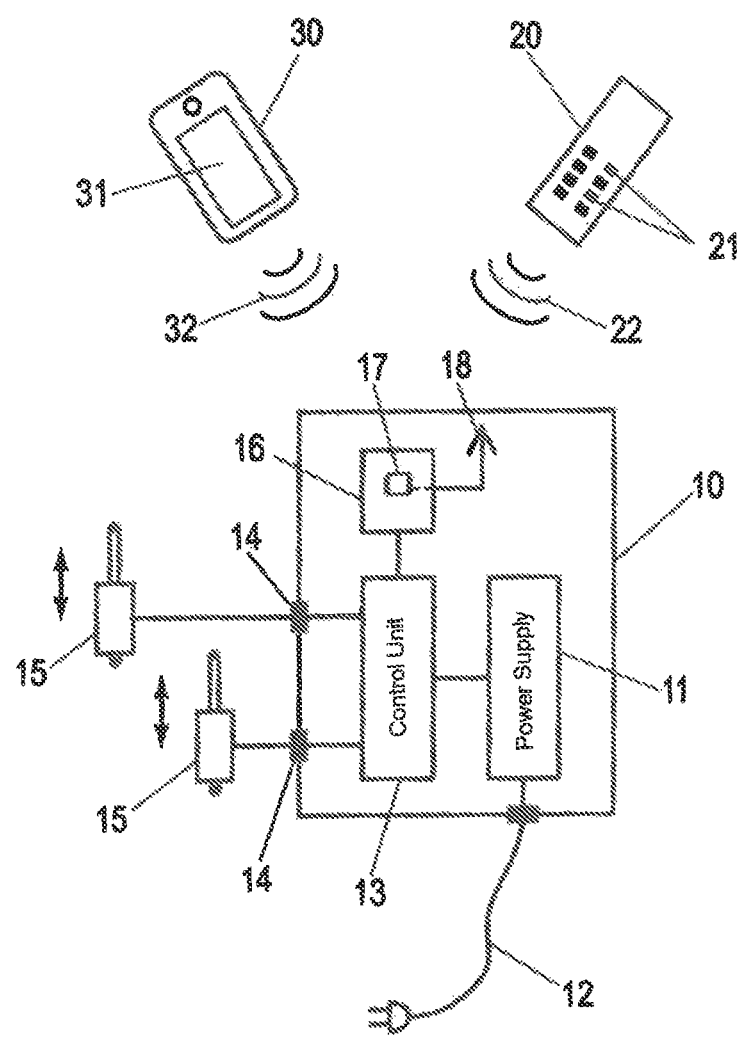

CONTROL DEVICE AND CONTROL SYSTEM FOR AN ELECTROMOTIVE ADJUSTING DRIVE OF AN ITEM OF FURNITURE

CROSS-REFERENCES TO RELATED APPLICATIONS

This application is the U.S. National Stage of International Application No. PCT/EP2018/062691, filed May 16, 2018, which designated the United States and has been published as International Publication No. WO 2018/210915 A1 and which claims the priority of German Patent Application, Ser. No. 20 2017 102 949.2, filed May 16, 2017, pursuant to 35 U.S.C. 119(a)-(d).

BACKGROUND OF THE INVENTION

The invention relates to a control system for controlling at least one adjusting drive for a piece of furniture, comprising a control device connected to the at least one adjusting drive and an operating unit, wherein the control device is adapted to receive signals from the operating unit transmitted wirelessly over a transmission link by means of a transmission unit and to control the at least one adjusting drive as a function of the received signals. The invention also relates to such a control device for the at least one adjusting drive.

Adjusting drives, often also referred to as electromotive furniture drives, are installed in reclining and seating furniture in order to be able to comfortably adjust furniture components such as seats, backrests, footrests etc. relative to a base body of the furniture and relative to each other. Adjustable seating furniture, in particular so-called TV or relaxation chairs, usually have a relatively complex mechanical furniture fitting which, in combination with a large number of levers and rod assemblies, enables the various upholstered units mounted on it to move in a complex sequence. In the case of beds or other reclining furniture, a frame is usually provided as the basic element, which carries a slatted frame with movable head and foot sections.

For the control and power supply of the adjusting drives, the above-mentioned control device is arranged on or in the furniture, which receives the operating commands of a user from an operating unit and converts them into control signals for the adjusting drives. The control device and operating unit form the control system for the adjusting drives.

Wireless operating units are known for operating the control device and thus the adjusting drives, which have at least one operating element and one transmission unit for wireless transmission of signals depending on the actuation of the at least one operating element. Such a wireless operating unit, often referred to as a remote control, can use radio signals, light, especially infrared light, or ultrasound to transmit the signals. Wireless operating units are convenient to use and easy to set up thanks to the availability of integrated circuits specially designed for this purpose. Moreover, the high number of such circuits used in consumer electronics in remote controls for televisions, etc., makes them cost-effective.

Such wireless operating units are usually tailored to a specific control device or type of control device and are sold as initial equipment with the control device. Due to the higher range, radio-based operating units have prevailed over those with infrared light or ultrasound. Wireless transmission is usually via a manufacturer-specific, proprietary protocol within one of the usable frequency ranges, in particular within one of the so-called ISM (Industrial, Scientific, Medical) bands.

In addition, the use of mobile devices such as smartphones and tablet computers as operating units is well known. These devices usually have various radio-based wireless transmission options, such as WLAN (Wireless Local Area Network), Bluetooth or other short-range radio systems such as NFC (Near Field Communication).

The advantage for the user is that he can use his existing mobile device and reduce the number of electronic devices in the household. It is only necessary to download a corresponding program ("App"), which gives the mobile device the necessary functionality as an operating unit. Cost savings are often associated with the fact that no separate operating unit with a furniture drive has to be purchased. However, the use of mobile devices as operating units is not desired by all customers. Even when using the electromotive adjusting drives in hospitals or care facilities, it makes more sense to use a separate operating unit permanently assigned to the adjusting drive.

For the manufacturer of control devices for adjusting drives, this results in the necessity to manufacture and maintain the same type of control devices in different modifications, namely in a configuration designed for operation with the proprietary operating unit and in a further configuration that can be controlled by a mobile device used as an operating unit.

It is therefore an object of the present invention to create a control system or a control device in which the aforementioned disadvantages do not occur.

SUMMARY OF THE INVENTION

This object is solved by a control system and a control device of an electromotive furniture drive with the respective features of the independent claims. Advantageous embodiments and further developments are indicated in the respective dependent claims.

A control system according to the invention and of the type mentioned above is characterized in that the control device is also configured to receive further signals from a further operating unit transmitted wirelessly via a further transmission link by means of the transmission unit and to control the at least one adjusting drive depending on the further signals received, wherein the further transmission link differs from the transmission link of the aforementioned operating unit.

By extending the control device or the transmission unit of the control device so that two different transmission links can be served simultaneously, a single control device can be used both for use with the proprietary device and for use with a mobile device. Even though the individual device is more complex as a result and may be at least slightly more expensive to manufacture, there is still an advantage for the manufacturer as a whole since there is no need for parallel development, production and storage of two differently designed control units. The advantage for the user is that, even if a proprietary operating unit is available, he can alternatively use a mobile device for control.

In an advantageous embodiment of the control system, the transmission unit has a shared antenna for both transmission links. This is advantageously possible if both transmission links use the same frequency bands or frequency bands that are close together in the frequency space. For example, both transmission links can preferably use the same ISM frequency band, e.g. by using different frequency channels of this same frequency band. The transmission link and the further transmission link may also differ in the protocols used. At least one of the protocols is preferably a Bluetooth protocol, which is usually used by all modern mobile devices. A so-called low-energy Bluetooth protocol is particularly preferably used, which advantageously does not require a permanently existing transmission link. In this way, time periods in which the low-energy Bluetooth connection is not active can be used to transmit signals or data from the other transmission link, for example the transmission link using a proprietary protocol.

An inactive low-energy Bluetooth connection is always present if there are no signals or data from the other or further transmission link. Signals or data of the (proprietary) transmission link can then be transmitted in these time periods.

In principle, proprietary transmission via the transmission link describes a simplified signal and data structure adapted to the furniture and the control system, since only simple adjustment commands have to be transmitted. This allows the commands to be transmitted in very short periods of time. Thus it is possible that the further transmission link also has an adapted signal and data structure, which enables equally short periods of time for the transmission of the signals or data. The time gaps are correspondingly large. Their length is considerably greater and corresponds to at least three times the length of a period of time for the transmission of signals or data.

The requirements for the control device are also adapted in such a way that there is no need to agree on the transmission release between the operating units. In practice, the user will only ever use one of the operating units. Nevertheless, the control device is adapted to suppress received signals or data when signals or data are already being transmitted over one of the other transmission links. Thus double operations or contradictory operating intentions are excluded.

In principle, the invention is not limited to the use of a Bluetooth connection through the further transmission link. The further transmission link can also carry other transmission protocols such as ZigBee, WLAN or those which transmit signals or data within individual time periods.

A control device according to the invention for controlling at least one adjusting drive has a transmission link for receiving wirelessly transmitted signals from an operating unit for controlling the at least one adjusting drive. It is characterized in that the transmission unit has a transmitter and receiving module which is connected to an antenna and which can be coupled simultaneously to two different transmission links. In this way, the transmission unit can interact with both different operating units with minimal component effort. Preferably, since the structure is simple, the transmitter and receiver module is designed as a System-on-Chip (SoC). Suitable transmitter and receiver modules are now readily available for use in mobile devices due to the spread of the 2.4 GHz (Giga-Hertz) band in particular.

BRIEF DESCRIPTION OF THE DRAWING

The invention is explained in more detail below by reference to a FIGURE.

The only FIGURE shows a block diagram of a control system of an electromotive furniture drive with two adjusting drives.

DETAILED DESCRIPTION OF PREFERRED EMBODIMENTS

The control system shown in FIG. 1 can be used, for example, in a piece of seating or reclining furniture, e.g. an armchair or a bed, which is equipped with adjusting drives.

The control system comprises a control device 10, to which two adjusting drives 15 are electrically connected by way of example. The adjusting drives 15 are designed as individual drives, i.e. each of the shown adjusting drives 15 is usually coupled within the furniture to a movable furniture part for its adjustment. Instead of the individual adjusting drives 15 shown, it is also possible to use a so-called double adjusting drive, which integrates two adjusting drives in one housing.

In principle, every furniture drive is designed to be able to adjust the connected furniture components relative to each other. In principle, every furniture drive has at least one gear train, wherein an abating gear stage can be designed as a linear gear in the manner of a threaded spindle-nut gear. The linear gear can be preceded by a rotary gear, e.g. in the form of a worm gear, which is coupled on the input side to an electric motor.

Another component of the control system is at least one operating unit, via which a user of the system can control the adjustment of the furniture parts via the adjusting drives 15.

In the illustrated embodiment example, two operating units 20, 30 are provided, i.e. a (proprietary) operating unit 20 and a further operating unit 30, which is formed by a mobile device, in this example a smartphone, which has a corresponding program ("App") in order to provide the necessary functionality.

The proprietary operating unit 20 has a plurality of control elements 21, which are buttons in this case. When one of the control elements 21 is actuated, a corresponding signal is emitted via a transmission link 22 in the direction of the control device 10. The other operating unit 30 has a touchscreen 31 for operation, which can be used to receive inputs from the user. In response to these inputs, a corresponding signal is also transmitted to the control device 10 via a further transmission link 32.

In the example shown, control device 10 comprises a power supply unit 11 for supplying power to control device 10 and also to the adjusting drives 15. The power supply unit 11 is in turn supplied with operating current via a power cable 12. In an alternative configuration, power can also be supplied via an external power supply unit.

Furthermore, a control unit 13 is arranged in the control device 10, which controls the electric motors contained in the adjusting drives 15 and, optionally, also evaluates limit switches arranged in the adjusting drives 15. For this purpose, adjusting drives 15 are connected via cables to adjusting drive connections 14 of control device 10. Signal lines can also be provided within the connections between the adjusting drives 15 and the control unit 13 via which a position of an output element of the adjusting drive 15 is transmitted to the control unit 13 in order to take this position signal into account when actuating the adjusting drives 15.

Furthermore, the control device 10 has a transmission unit 16 which is coupled to the control unit 13. The transmission unit 16 comprises a transmitting and receiving module 17 which is coupled to an antenna 18. The antenna 18 and the transmitting and receiving module 17 receive control signals from the operating units 20, 30, which are then forwarded in the form of control commands to the control unit 13 for actuating the adjusting drives 15.

According to the application, the transmission unit 16 is adapted to receive and evaluate signals (quasi) simultaneously from the operating units 20, 30. Both transmission links 22, 32 operate in the same frequency band, so that the signals transmitted via both transmission links 22, 32 can be received or transmitted by one antenna 18. The transmitting and receiving module 17 is also preferably able to serve both transmission links. A single transmitting and receiving module 17 is then sufficient to use both transmission links 22, 32.

Both transmission links 22, 32 are usually formed bi-directional in order to be able to carry out a protocol based on a handshake procedure. The bi-directional design of the transmission links 22, 32 also allows information to be transmitted from the control device 10 to the operating unit 20, 30, for example to display status messages from the control device 10 and/or the adjusting drives 15 to the operating unit 20, 30. This is of particular interest in connection with the additional operating unit 30, as information can be easily displayed on the touchscreen 31.

Even when using the same frequency band, for example the 2.4 GHz band through transmission links 22, 32, the signals of the different transmission links 22, 32 can be distinguished by using different channels within the same frequency band. Furthermore, the different transmission links 22, 32 can use different protocols. In one embodiment, for example, the proprietary operating unit 20 uses a proprietary protocol, whereas the other operating unit uses a standardized protocol, in particular a low-energy Bluetooth protocol. During initialization, the low-energy Bluetooth protocol couples the devices, i.e. the additional operating unit 30 and the control device 10. This coupling is subsequently (logically) maintained, even if signals are seldom and/or irregularly exchanged between the units involved. The resulting time gaps can be used to exchange signals between the proprietary operating unit 20 and the transmission unit 16.

Since the amount of information or data required to control the adjusting drives 15 is very small compared to the bandwidth of the transmission links 22, 32, the transmission links 22, 32 are only used to a very limited extent. Correspondingly, the probability that signals from transmission links 22 and 32 collide is very low. As a rule, collision protection mechanisms are also provided in the protocols used which, in the event of a collision, lead to a repetition of the data transmission with a randomly selected delay time, so that a further collision in the repeat attempt is practically impossible.

In order to enable a simple design of the control device, the transmitter and receiver module is advantageously designed as a SoC, i.e. a system in which different components are integrated on a single chip. In the case of the transmitting and receiving module these components include, for example, the analog high-frequency components as well as a microcontroller for signal evaluation.

What is claimed is:

1. A control system for controlling an adjusting drive for a piece of furniture, said control system comprising:
   a first operating unit generating first control signals and/or data in response to a first user input;
   a second operating unit generating second control signals and/or data in response to a second user input;
   a transmission unit; and
   a control device connected to the adjusting drive, said control device configured to receive the first control signals and/or data from the first operating unit wirelessly via the transmission unit over a first transmission link and to control the adjusting drive as a function of the received first control signals and/or data, said control device further configured to receive the second control signals and/or data from the second operating unit wirelessly via the transmission unit over a second transmission link and to control the adjusting drive as a function of the received second control signals and/or data, with the second transmission link differing from the first transmission link, wherein the control device is adapted to suppress received control signals and/or data over one of the first and second transmission links when control signals and/or data are already being transmitted over the other one of the first and second transmission links.

2. The control system of claim 1, wherein the transmission unit comprises a shared antenna for the first and second transmission links.

3. The control system of claim 1, wherein the first and second transmission links use a same ISM (Industrial, Scientific, Medical) frequency band.

4. The control system of claim 1, wherein the first and second transmission links use different frequency channels of a same frequency band.

5. The control system of claim 1, wherein the first and second transmission links have different protocols.

6. The control system of claim 5, wherein at least one of the protocols is a Bluetooth protocol.

7. A control device for controlling an adjusting drive for a piece of furniture, said control device comprising:
   an antenna; and
   a transmission unit configured to receive wirelessly first control signals and/or data transmitted from a first operating unit generated in response to a first user input over a first transmission link and to receive wirelessly second control signals and/or data transmitted from a second operating unit generated in response to a second user input over a second different transmission link for controlling the adjusting drive, said transmission unit comprising a transmitting and receiving module connected to the antenna and configured for coupling simultaneously to the two different transmission links, wherein the control device is adapted to suppress received control signals and/or data over one of the first and second transmission links when control signals and/or data are already being transmitted over the other one of the first and second transmission links.

8. The control device of claim 7, wherein the transmitting and receiving module is configured as a system-on-chip.

* * * * *